United States Patent [19]

Hauser

[11] Patent Number: 4,541,455

[45] Date of Patent: Sep. 17, 1985

[54] AUTOMATIC VENT VALVE

[75] Inventor: Hugo Hauser, Palo Alto, Calif.

[73] Assignee: Tritec Industries, Inc., Mountain View, Calif.

[21] Appl. No.: 559,636

[22] Filed: Dec. 12, 1983

[51] Int. Cl.⁴ .................................................. F16K 15/02
[52] U.S. Cl. ................................ 137/516.27; 137/540; 417/502
[58] Field of Search .................... 137/516.25, 516.27, 137/583, 540, 517; 417/435, 502; 92/79

[56] References Cited

U.S. PATENT DOCUMENTS

| 930,646 | 8/1909 | Caille | 417/502 |
|---|---|---|---|
| 1,361,738 | 12/1920 | McVoy | 137/516.25 UX |
| 1,981,507 | 11/1934 | Harris | 417/502 UX |
| 2,543,828 | 3/1951 | Brown | 417/435 |

FOREIGN PATENT DOCUMENTS

| 109417 | 10/1898 | Fed. Rep. of Germany | 137/517 |
|---|---|---|---|
| 665886 | 9/1938 | Fed. Rep. of Germany | 417/502 |
| 2310928 | 10/1973 | Fed. Rep. of Germany | 417/502 |
| 401358 | 8/1909 | France | 137/517 |
| 1402854 | 8/1975 | United Kingdom | 137/517 |

Primary Examiner—Robert G. Nilson
Attorney, Agent, or Firm—Thomas E. Schatzel

[57] ABSTRACT

An automatic vent valve having a stoppage member within a flow chamber located between an inlet chamber and vent chamber with said stoppage member being biased against a lower seat. The stoppage member moves between said lower seat and an upper seat in response to pressure changes associated with the operation of a positive displacement pump which either overcomes said biasing means or allows said biasing means to function. During the movement of the stoppage member between the upper and lower seats a flow path exists between the inlet chamber and vent chamber such that gases and/or fluid are vented on each stroke of the pump.

7 Claims, 3 Drawing Figures

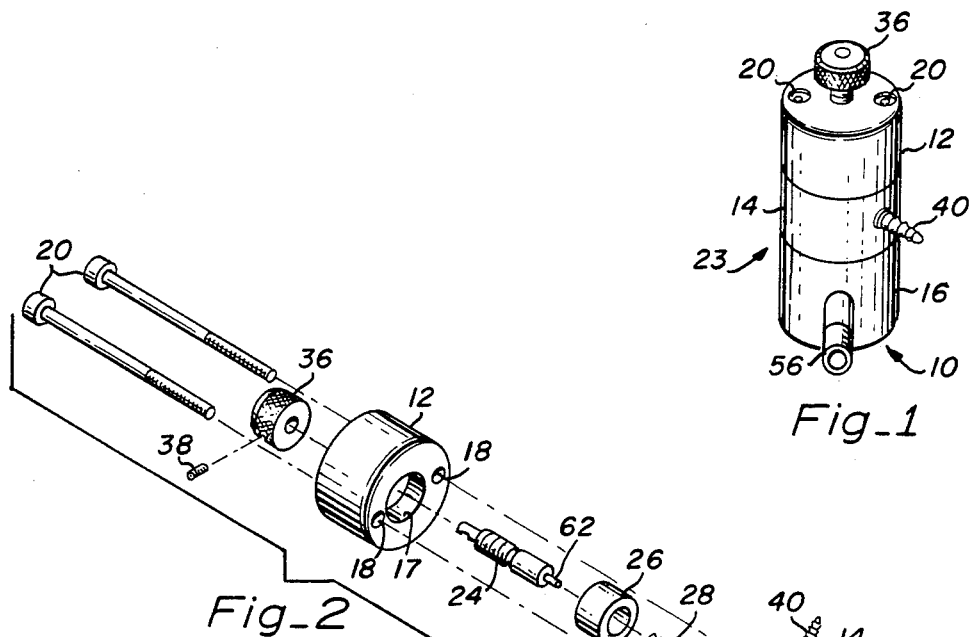
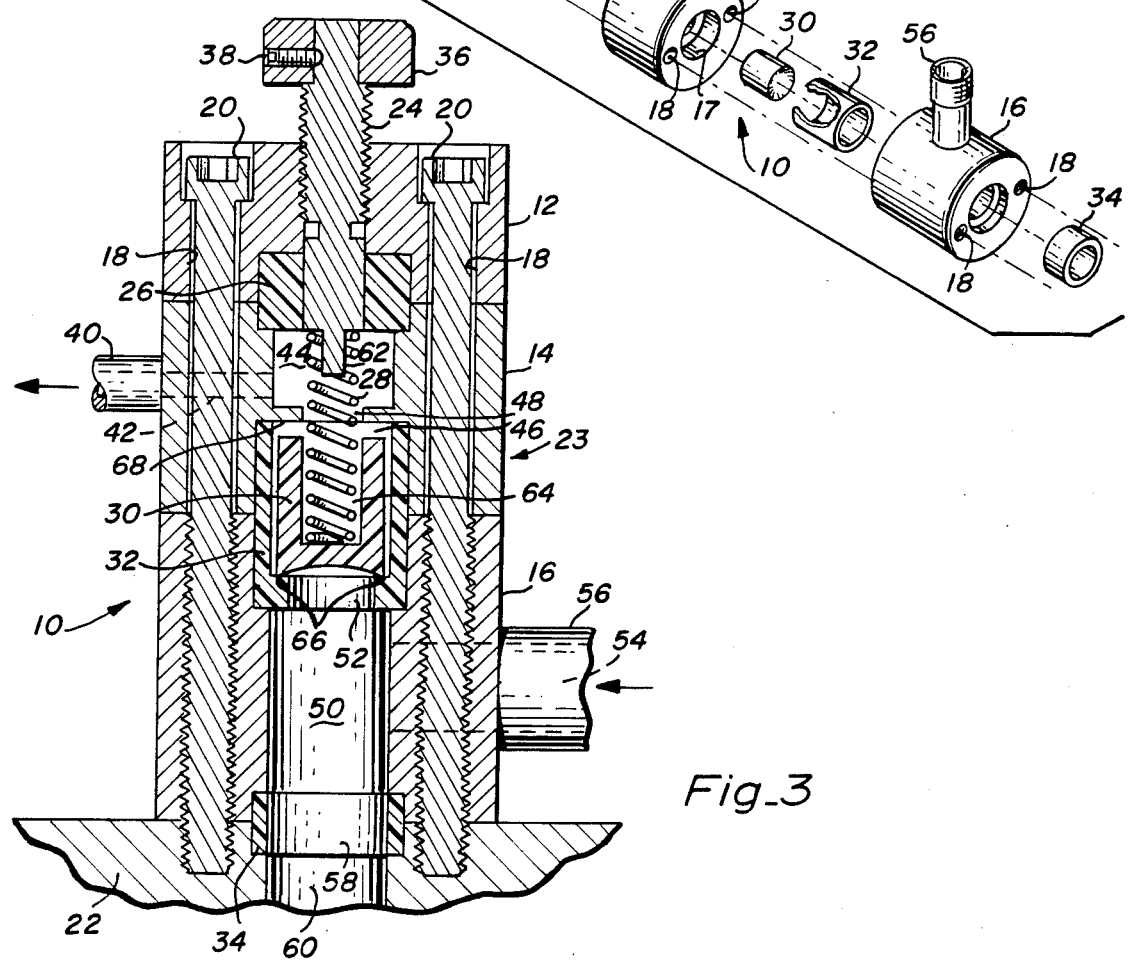

AUTOMATIC VENT VALVE

BACKGROUND OF THE INVENTION

1. Field of the Invention

The invention relates generally to automatic vent valves and more particularly to an automatic vent valve wherein a limited venting of a fluid system occurs on both the discharge and suction strokes of a positive displacement pump.

2. Description of the Prior Art

As a part of the manufacturing process for the production of semiconductors, photoresist, which is a fluid, is applied to silicon wafers. Typically, positive displacement pumps are used to meter the photoresist. An example of one such pump is disclosed in U.S. Pat. No. 4,139,333 issued to Sipos. An improved pump and fluid system is the subject of a pending application Ser. No. 340,644, now U.S. Pat. No. 4,483,665 by the present applicant.

When the photoresist is pulled into the positive displacement pump, it is subjected to a slight vacuum which allows some constituents of the photoresist to enter a gaseous state. The gases tend not to dissolve and result in bubbles in the photoresist applied to the wafers. This causes streaks on the wafers and renders them defective. The problem with gas coming out of solution is aggrevated as the altitude of the processing location increases.

Conventional photoresist dispensing systems use a manually operated vent valve. The manual vent valve is used primarily for venting the system when starting the pump. The valve is opened with its outlet directed to the supply of photoresist fluid. When a steady stream of liquid is observed, the system has been vented and the vent valve is shut. The manual vent valve is of little usefulness in venting gases during pump operation.

Another situation in which venting is necessary is when the photoresist fluid supply is changed. Typically, a hose runs from the pump suction to an open bottle of photoresist fluid. This hose must be removed and placed in a new bottle when changing photoresist supply. This operation introduces air to the hose which must be vented from the system. Generally, this is done by operating the pump for ten to fifteen strokes with the manual vent valve open. This results in lost operation time for the photoresist dispensing system.

In some photoresist fluid dispensing systems, the discharge of the pump is directed through a filter element. Typically, the filter medium is compressed by the fluid pressure created during the discharge stroke of the positive displacement pump. During the suction stroke of the pump, the filter medium tends to expand causing a pressure build-up in the system. Such a pressure build-up could cause dripping of the photoresist and render a wafer defective. One means for relieving such pressure build-up caused by filter expansion is disclosed in application Ser. No. 340,644 mentioned above.

SUMMARY OF THE PRESENT INVENTION

It is therefore an object of the present invention to provide a vent valve which automatically removes gases from a fluid system.

It is a further object of the present invention to provide a vent valve which reduces lost operation time when switching fluid supplies.

It is a further object of the present invention to provide a vent valve which relieves pressure build-up in a fluid system due to filter medium expansion.

Briefly, the present invention includes a valve which permits flow through it for a brief period on a discharge and suction strokes of a positive displacement pump. The valve comprises a stoppage member slidably mounted in a flow channel between an inlet chamber and a vent chamber. There are upper and lower stoppage member seats such that when the stoppage member is brought into contact with one of the seats, flow from the inlet chamber through the flow chamber into the vent chamber is prevented. The valve includes a means for biasing the stoppage member such as to cause the stoppage member to be in contact with the lower seat in the absence of other forces.

The inlet chamber is in communication with the discharge of a positive displacement pump in a fluid system. During the discharge stroke of the pump, the pressure of the pumped fluid overcomes the bias means and slides the stoppage member off its lower seat and onto its upper seat. During this motion, a path exists around the stoppage member between the inlet chamber and the vent chamber permitting venting of the fluid system. Upon completion of the discharge stroke, the bias means returns the stoppage member from its upper seat to its lower seat. During such travel of the stoppage member, once again a path exists between inlet and vent chambers around the stoppage member through the flow chamber permitting the relief of any pressure build-up and/or the venting of gases in the system. The process is repeated on each subsequent stroke of the positive displacement pump.

An advantage of the vent valve of the present invention is that gases are automatically vented from a fluid system.

Another advantage of the vent valve is that lost operation time is reduced following change of fluid supply.

A further advantage is that the vent valve of the present invention allows relief of pressure build-up in a fluid system due to filter medium expansion.

These and other objects and advantages of the present invention will no doubt become obvious to those of ordinary skill in the art after having read the following detailed description of the preferred embodiment which are illustrated in the various drawing figures.

IN THE DRAWINGS

FIG. 1 is a prospective view of an automatic vent valve in accordance with the present invention;

FIG. 2 is an exploded view of an automatic vent valve in accordance with the present invention; and FIG. 3 is a cross sectional view of an automatic vent valve in accordance with the present invention;

DETAILED DESCRIPTION OF THE PREFERRED EMBODIMENTS

In FIG. 1 there is illustrated an automatic vent valve referred to by the general reference numeral 10 and incorporating the present invention. As shown in FIG. 2, the automatic vent valve 10 includes an upper valve housing 12, a center valve housing 14 and a lower valve housing 16, all of which are cylindrical in shape and having a coaxial bore 17 of varying diameters. A pair of diametric bores 18 run through housings 12, 14 and 16. Said bores 18 receive a pair of fasteners 20 which when treaded into a valve mount 22 (see FIG. 3) cause the adjacent flat surfaces of housings 12, 14 and 16 to matingly engage to form a valve housing assembly 23 illustrated in FIGS. 1 and 3.

As illustrated in FIG. 2 there are arranged within valve housing 23, a bias adjustment shaft 24, an upper bushing 26, a spring 28, a stoppage member 30 mounted within a flow channel sleeve 32 and a lower bushing 34. A knob 36 is mounted on the upper end of bias adjustment shaft 24 by means of a set screw 38.

A vent outlet fitting 40 is mounted on center housing 14. A vent conduit 42 runs through fitting 40 and communicates with a cylindrical vent chamber 44 centrally formed within housing 14 by bore 17. Vent chamber 44 connects to a flow chamber 46 through a first circular aperture 48. Flow chamber 46 connects to an inlet chamber 50 through a second circular aperture 52 in flow channel sleeve 32. An inlet conduit 54 runs from inlet chamber 50 to an inlet fitting 56 mounted on lower housing 16. Inlet chamber 50 also connects to an outlet aperture 58 through lower bushing 34 which in turn connects to an outlet conduit 60 in valve mount 20.

Spring 28 is positioned about the axis of valve housing assembly 23 between a stub 62 on the lower end of shaft 24 and stoppage member 30. Stoppage member 30 is a cylinder with an internal hollow cylinder 64 opening upward and into which spring 28 fits. Spring 28 tends to bias stoppage member 30 against a lower seat 66 on flow chamber sleeve 32. With spring 28 forcing stoppage member 30 onto seat 66, vent chamber 44 and flow chamber 46 are isolated from inlet chamber 50 as shown in FIG. 3. When the biasing effect of spring 28 is overcome, stoppage member 30 is able to move upward in flow chamber 46 within flow chamber sleeve 32. At the upper limit of its travel, stoppage member 30 engages an upper seat 68 isolating vent chamber 44 from flow chamber 46 and inlet chamber 50.

The biasing effect of spring 28 can be adjusted by moving bias adjustment shaft 24 to cause more or less compression of spring 28. Movement of shaft 24 is by means of a threaded portion of shaft 24 and upper housing 12.

In operation, inlet fitting 56 is connected to the discharge of a positive displacement pump in a fluid system. Vent outlet fitting 40 is typically connected to a line which is directed to a suitable vented container such that gases vented from the fluid system through automatic vent valve 10 can escape and any fluid which flows through vent conduit 42 can be contained for disposal or reuse. Outlet conduit 60 may be directed to a filter element of the fluid system which in turn is connected to a fluid dispensing means or directly to said fluid dispensing means.

On the discharge stroke of the positive displacement pump, fluid under pressure flows through inlet conduit 54 (in the direction indicated on FIG. 3) into inlet chamber 50. The fluid exerts pressure on stoppage member 30 such that the biasing force of spring 28 is overcome permitting stoppage member 30 to rise off lower seat 66 and travel upward until stoppage member 30 seats against upper seat 68. The typical travel of stoppage member 30 is approximately 15 mils. During the time it takes stoppage member 30 to move from its lower seat 66 to its upper seat 68, fluid and/or gases can flow from inlet chamber 50 through aperture 52 into flow chamber 46 around stoppage member 30 and into vent chamber 44 through aperture 48 where the fluid and/or gases are discharged through vent conduit 42.

Upon completion of the discharge stroke of the pump, the pressure on stoppage member 30, overcoming the force of spring 28 is reduced and stoppage member 30 is moved by spring 28 off upper seat 68 and onto lower seat 66. During the time it takes stoppage member 30 to travel from seat 68 to seat 66, the flow path describe above exists between inlet chamber 50 and vent chamber 44. Any pressure which may have built up in the fluid system is thus relieved through vent conduit 42 during the return of stoppage member 30 to lower seat 66. Also, any gases present will be vented at the same time. As discussed above, when the pump discharges through a filter element, the filter medium may be compressed during the discharge stroke. Subsequently, the filter medium expands creating an increase in pressure in the filter. Typically, the outlet of the filter is closed following the discharge stroke of the pump, allowing such pressure to be relieved through the means described above. The pressure build-up is not sufficient to overcome spring 28 and can be relieved by the flow occuring during the return of stoppage member 30 to lower seat 66.

The process of venting on discharge stroke and relieving thereafter is repeated automatically as a positive displacement pump continues to operate.

Although the present invention has been described in terms of the present preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. An automatic vent valve for use in combination with a positive displacement pump comprising:
   a body for the vent valve;
   an inlet chamber formed through the body for communication with the discharge of a positive displacement pump;
   an outlet channel connected in direct flow communication with the inlet chamber through the body;
   a vent chamber formed in the body;
   a flow channel extending in the body from said inlet chamber to said vent chamber;
   a stoppage member, which is a cylinder and has an internal space formed about the axis of said cylinder and opening upward, slidably mounted intermediate said inlet and vent chambers in said flow channel;
   an upper stoppage member seat;
   a lower stoppage member seat;
   a means seated in said internal space for biasing said stoppage member onto said lower seat in a position which prevents flow from said inlet chamber into said flow channel;
   whereby said biasing means can be overcome by pressure within said inlet chamber such that, during the period that said stoppage member moves from said lower seat to said upper seat where flow is blocked from said flow channel into said vent chamber, flow is permitted between said inlet chamber through said flow channel into said vent chamber and such that, during the period of removal of such pressure, said stoppage member moves from said upper seat to said lower seat and flow is permitted between said inlet chamber through said flow channel into said vent chamber.

2. An automatic vent valve comprising:

an inlet chamber in communication with the discharge of a positive displacement pump;

a vent chamber;

a flow channel extending from said inlet chamber to said vent chamber;

a cylindrical stoppage member slidably mounted intermediate said inlet and vent chambers in said flow channel;

an upper stoppage member seat;

a lower stoppage member seat;

a flow channel sleeve, which is substantially a hollow cylinder adapted to include said lower stoppage member seat, located in the flow channel and surrounding the cylindrical stoppage member; and a means for biasing said stoppage member onto said lower stoppage member seat in a position which prevents flow from said inlet chamber into said flow channel;

said biasing means exerting a force which can be overcome by pressure within said inlet chamber such that said stoppage member moves from said lower seat to said upper seat where flow is blocked from said flow channel into said vent chamber during which movement flow is permitted between said inlet chamber through said flow channel into said vent chamber and upon removal of such pressure said stoppage member moves, by the force of said biasing means, from said upper seat to said lower seat during which movement flow is permitted between said inlet chamber through said flow channel into said vent chamber.

3. The vent valve of claim 2, wherein said flow channel sleeve and said stoppage member are constructed of a thermal plastic material.

4. An automatic vent valve comprising:

an inlet chamber in communication with the discharge of a positive displacement pump;

a vent chamber;

a flow channel extending from said inlet chamber to said vent chamber;

a stoppage member which is a cylinder having a concave bottom and which has an internal space formed about the axis of said cylinder and opening upward, slidably mounted intermediate said inlet and vent chambers in said flow channel;

an upper stoppage member seat;

a lower stoppage member seat;

a means seated in said internal space for biasing said stoppage member onto said lower seat in a position which prevents flow from said inlet chamber into said flow channel;

whereby, said biasing means can be overcome by pressure within said inlet chamber such that, during the period that said stoppage member moves from said lower seat to said upper seat where flow is blocked from said flow channel into said vent chamber, flow is permitted between said inlet chamber through said flow channel into said vent chamber and such that, during the period of removal of such pressure, said stoppage member moves from said upper seat to said lower seat and flow is permitted between said inlet chamber through said flow channel into said vent chamber.

5. The vent valve of claim 4, wherein said means for biasing comprises a helical compression spring.

6. The vent valve of claim 4, wherein said vent chamber is connected to a conduit out of said valve.

7. The vent valve of claim 4, wherein said movement of said stoppage member is approximately 15 mils in length.

* * * * *